United States Patent [19]

Aravind et al.

[11] Patent Number: 5,134,476
[45] Date of Patent: Jul. 28, 1992

[54] VIDEO SIGNAL ENCODING WITH BIT RATE CONTROL

[75] Inventors: Rangarajan Aravind, Red Bank; Barin G. Haskell, Tinton Falls, both of N.J.; Atul Puri, New York, N.Y.

[73] Assignee: AT&T Bell Laboratories, Murray Hill, N.J.

[21] Appl. No.: 502,378

[22] Filed: Mar. 30, 1990

[51] Int. Cl.[5] .......................................... H04N 7/12
[52] U.S. Cl. ...................... 358/133; 358/135
[58] Field of Search ............ 358/133, 135, 136, 134, 358/141

[56] References Cited

U.S. PATENT DOCUMENTS

| | | | |
|---|---|---|---|
| 4,023,199 | 5/1977 | Netravali et al. | 358/13 |
| 4,218,704 | 8/1980 | Netravali et al. | 358/136 |
| 4,672,441 | 6/1987 | Hoelzlwimmer et al. | 358/135 |
| 4,706,265 | 11/1987 | Furakawa | 375/122 |
| 4,805,030 | 2/1989 | Tanaka | 358/260 |
| 4,831,636 | 5/1989 | Taniguchi et al. | 375/27 |
| 4,868,653 | 9/1989 | Golin et al. | 358/133 |
| 4,931,869 | 6/1990 | Amor et al. | 358/133 |
| 4,954,892 | 9/1990 | Asai et al. | 358/133 |
| 4,958,226 | 9/1990 | Haskell et al. | 358/136 |
| 4,999,704 | 3/1991 | Ando | 358/133 |
| 5,034,804 | 7/1991 | Sasaki et al. | 358/41 |

OTHER PUBLICATIONS

"Interframe Coding of 525-Line, Monochrome Television at 1.5 Mbits/s, B. G. Haskell, P. L. Gordon, R. L. Schmidt, J. V. Scattaglia, IEEE Transactions on Communications", vol. Com-25, No. 11, Nov. 1977, pp. 1339-1348.

"Adaptive Coding of Monochrome and Color Images", W-H. Chen and C. H. Smith, IEEE Transactions on Communications, vol. Com-25, No. 11, Nov. 1977 pp. 1285-1291.

"Advances in Picture Coding", H. G. Musmann, P. Pirsch, H-J. Grallert, Proceedings of the IEEE, vol. 73, No. 4 Apr. 1985, pp. 523-548.

*Primary Examiner*—James J. Groody
*Assistant Examiner*—Safet Metjahic
*Attorney, Agent, or Firm*—B. H. Freedman

[57] ABSTRACT

Individual frames in a video signal are encoded using different coding techniques such as intraframe, motion compensated prediction and motion compensated interpolation coding. The encoder output, which is produced at a first highly variable rate, is applied to a channel via a buffer that outputs the encoded signal at a second, less variable rate. The rate allocated to different frame types is determined as a function of the type of frame being encoded and the coding technique being used. A second buffer may be used to eliminate almost all variations in the rate at which data is applied to the channel. Buffer fullness may control characteristics of the encoder such as quantizer step size and/or prefiltering.

11 Claims, 3 Drawing Sheets

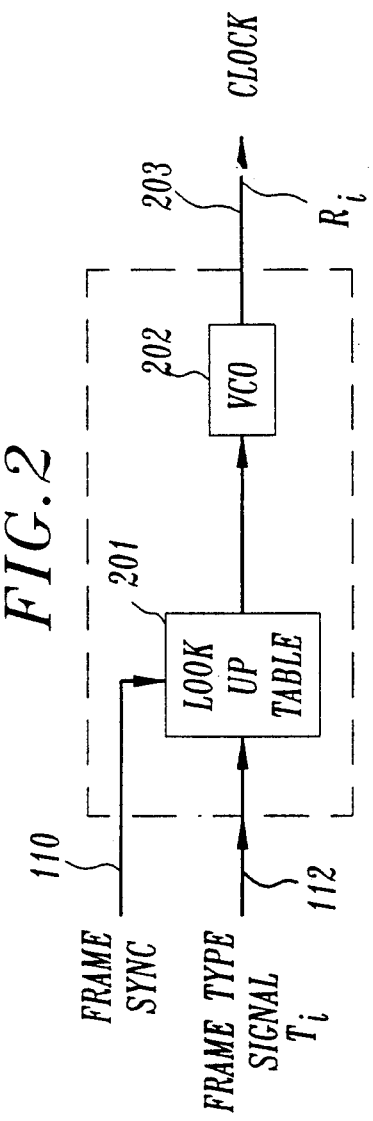
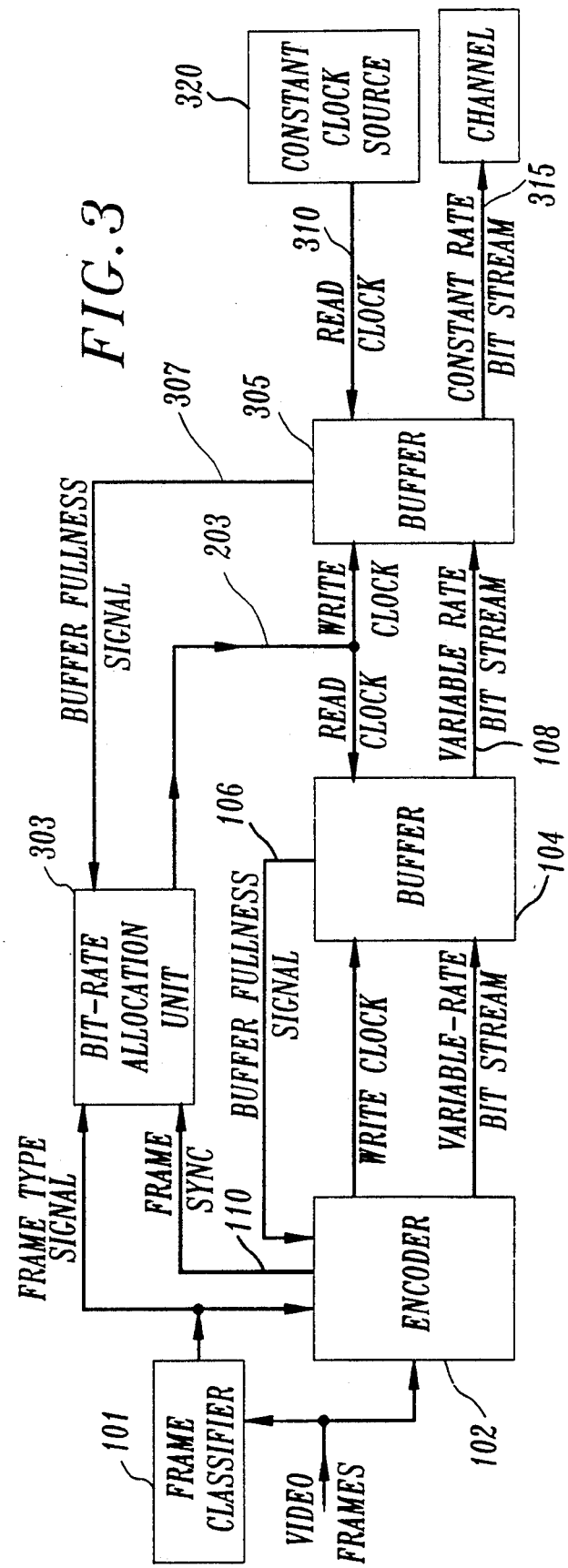

VIDEO SIGNAL ENCODING WITH BIT RATE CONTROL

TECHNICAL FIELD

This invention relates generally to video signal encoding, and, in particular, to encoding using multiple coding strategies in which the bit rate of the encoded signal, which can vary greatly from frame to frame, is controlled to reduce excessive variations.

BACKGROUND OF THE INVENTION

In various applications, such as compact video disc and high definition TV, in which video information is stored or transmitted digitally, it is desirable to compress the information so as to reduce required bandwidth or storage capacity. This compression can be accomplished by different coding strategies, such as prediction error coding, that take account of different characteristics of the video signal in order to reduce redundancy. For example, a 10:1 compression can generally be achieved by intraframe encoding, where, in one example, characteristics such as intensity, chrominance or luminance of picture elements (pels) are predicted based on the values of neighboring pels in the same frame, and the error or difference between the actual value and the predicted value is encoded. This type of coding is illustrated in a paper by W. H. Chen and C. H. Smith entitled "Adaptive Coding of Monochrome and Color Images," IEEE Trans. Communications, Vol. COM-25, pp. 1285-1292, Nov. 1977. Alternatively, in motion compensated prediction error (MCPE) encoding, the locations of moving objects are predicted, the actual and calculated intensities of the objects at those location are compared, and the differences are encoded. This type of coding is illustrated in a review paper by H. G. Musmann, P. Pirsch, and H. J. Grallert, entitled "Advances in Picture Coding," Proc. IEEE, VOL. 73, pp. 523-548, April 1985. As yet another example, interframe interpolation between the values of pels in spaced apart frames can be used to predict the values of pels in intermediate frames, as is also illustrated in the above cited Musmann paper.

When some of the above mentioned coding techniques, such as MCPE, are used, they typically produce a variable bit rate output. This is because the prediction errors vary in size. Since the errors are often quantized and encoded so as to achieve additional compression, for example by variable word length coding or run length encoding, time varying bit rate is thus produced. In other coding strategies, the bit rate varies due to the varying nature of the pictorial information being processed. As will be seen below, different bit rates are also produced when two or more encoding strategies are used, since each typically involves a different trade off between bit rate (compression) and pictorial accuracy (fidelity).

The task of keeping the average rate of generation of bits constant even in the presence of considerable instant to instant fluctuations has in the past been performed, for example, by writing the output of the coder to a buffer at a variable rate, and by reading the output of the buffer to a channel at the desired constant rate. To prevent buffer overflow, a buffering strategy is then employed in which buffer fullness is used to decrement or reduce the rate at which bits are applied to the buffer if the buffer is at or near its capacity. Such rate reduction can be achieved by, for example, increasing quantizer step size, adding low pass filtering, or otherwise changing the encoding strategy to one that produces fewer bits per frame. Conversely, buffer underflow is prevented by increasing the rate at which bits are applied to the buffer.

The buffer can, in some applications, be "real", i.e., hardware based. In other applications, such as packet networks where the channel rate can vary, the buffering functions can be "virtual", i.e., implemented in software. In the latter case, the virtual buffer serves to stabilize the short term average bit rate.

While the above described buffering generally works well if a single coding strategy is used, as they are in the Reference Model for visual telephony [H.261] proposed by CCITT, it has been found that if several coding techniques are used in combination on a group of frames, an even greater fluctuation in bit rate output from the encoder is encountered. This fluctuation cannot be handled by conventional buffering. The undesirable overflow and underflow conditions which result must be eliminated or reduced to a tolerable level in order to successfully process and decode the pictorial information.

SUMMARY OF THE INVENTION

In accordance with the present invention, the diverse bit rate requirements occasioned by use of different encoding strategies for different frames in a group of frames are met by arranging a first buffer that inputs the highly variable rate output of an encoder operating on a group of frames using a plurality of different coding strategies, but outputs the encoded information at a variable rate. This first buffer output rate is nominally determined as a function of a frame type signal that reflects the specific coding techniques being used by the encoder on the frames in the group, and the expected average bit rates normally associated with each strategy. If desired, the output of the first buffer can be applied to an additional (second) buffering unit, and the nominal read (output) timing used on the first buffer can be further adjusted by a time varying signal which, in addition to frame type, takes account of fullness in the second buffer.

BRIEF DESCRIPTION OF THE DRAWING

The present invention will be better understood and appreciated by a consideration of the following Detailed Description when read in light of the accompanying Drawing in which:

FIG. 2 is a block diagram of the bit rate allocation unit contained in the encoder of FIG. 1;

FIG. 3 is a block diagram similar to FIG. 1, in which an optional second buffer is included;

DETAILED DESCRIPTION

Figure 1:
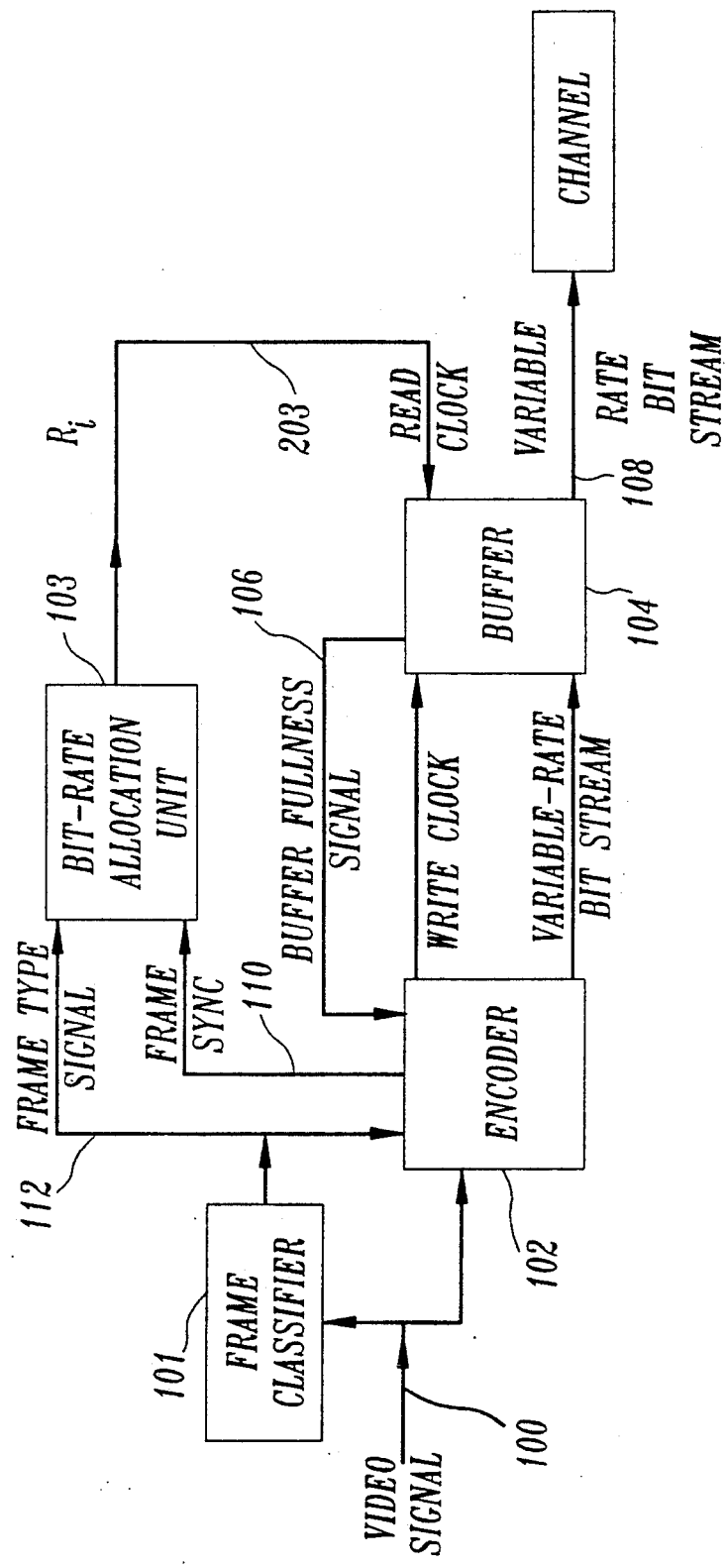
FIG. 1 is a block diagram of an encoder arranged in accordance with the present invention.

Referring first to FIG. 1, there is shown a block diagram of an encoder arranged in accordance with the present invention.

A video signal on line 100 is first input to a frame classifier 101, which generates a "frame-type signal" indicating which of several coding strategies or techniques is to be used to code the current input frame. Examples of available coding techniques are intraframe coding, motion compensated prediction error (MCPE) coding, and conditional motion compensated interpolation (CMCI) coding, to name a few. CMCI is described in U.S. Pat. No. 4,958,226 issued Sep. 18, 1990 to B.G. Haskell et al. The video signal could be derived from the output of a TV camera or other pictorial scanning device, or from other sources that generally provide information describing attributes (intensity, chrominance, luminance, etc.) of spatially defined elements (pels or pixels) of an image.

Frame classifier 101 may be arranged to operate either on groups of N frames in a "preprogrammed mode", explained below, in which each group is assumed, a priori, to be coded in a preselected pattern of several different strategies. However, where it is possible to transmit the frame type signal from the encoder of FIG. 1 to the decoder, individual frames may be evaluated and classified. In the latter situation, frame classifier 101 may be arranged in a manner similar to that used in segmenter 112 shown in FIG. 2 of U.S. Pat. No. 4,218,704 issued to A. N. Netravali et al. on Aug. 19, 1980. Yet other alternatives are illustrated in FIG. 2 of a paper by Haskell et al entitled "Interframe Coding of 525-line Monochrome Television at 1.5 Mbits/s" which appeared in IEEE Transactions on Communications, Vol. Com-25, No. 11, Nov.,1977, pages 1339–1348, and in FIG. 3 of U.S. Pat. No. 4,023,199 issued to A. N. Netravali et al. on May. 10, 1977.

If the preprogrammed mode is used, wherein the video input is clustered into groups of frames (GOF) each consisting of N frames, within each GOF, the $i^{th}$ frame i (i=1...N) is assigned a fixed frame-type $T_i$. $T_i$ is an integer between 1 and M, where M represents the number of available coding stratgies. Within a GOF, different frames may have the same or different types. However, when the preprogrammed mode is used, it will generally be the case that the frame type assignment does not change from GOF to GOF. Thus, every N-th frame of the video input has the same frame-type, and is coded accordingly. In this mode, the decoder is provided with the sequence of values for $T_i$, as, for example, by loading a RAM at the beginning of a transmission or by presetting values in a ROM. Otherwise, the values of $T_i$ are transmitted to the receiver or decoder at a remote location along with the encoded pictorial information.

Encoder 102 processes the input frames according to the coding technique determined by the frame-type signal output by frame classifier 101. As a result of the encoding process, encoder 102 generates an output bit-stream whose rate is unregulated and, thus, can fluctuate considerably. This variable-rate bit stream is fed into a buffer 104 under control of the write clock produced by encoder 102. As with other known coding systems, buffer 104 produces a buffer fullness signal on line 106 that is used by encoder 102 to prevent buffer overflow or underflow in the manner described heretofore, such as by increasing or decreasing the quantizer step size Qp in encoder 102 or by low pass filtering the input video signal. Qp can be adjusted at each of several intervals during the encoding of a frame. Whenever a change occurs, it is also transmitted over the channel so that the decoder is informed of the change.

In accordance with the present invention, data is not necessarily read out of buffer 104 at a constant rate. Instead, each frame i of the GOF is assigned its own bit allocation $R_i$ (bits), taking into account both the desired bit rate that can be accommodated by the transmission channel or other medium that receives the variable rate bit stream output from buffer 104 on line 108, as well as the frame-type signal $T_i$ generated by frame classifier 101. The bit assignment is made in bit-rate allocation unit 103, which during each frame $T_i$ generates a clock on line 203 having $R_i$ pulses that is used to read data out of buffer 104 and onto line 108. In this way, frame-type producing more data on the average can be assigned more channel capacity and buffer space, and conversely for frame-types producing fewer bits on the average. Also, the total amount of data produced for each GOF is controlled and tailored to both the buffer and channel capacity.

The fullness of buffer 104 is computed for each interval as follows. If there are $F_o$ bits in buffer 104 at the start of an interval, the step-size Qp is determined based upon $F_o$. The number of bits in buffer 104 at the start of the next interval is given by:

$F_o$+(bits generated in encoder 102 during the interval)−(bits read out of buffer 104 during the interval).

The number of bits read out is determined by dividing the allocation $R_i$ for frame $T_i$ by the number of intervals in the frame.

It is sometimes advantageous to inhibit changes in Qp when certain frame types (for example, intraframe coded frames) are encoded. If an upper bound is available on the number of bits that can be generated for these frame types, the same step-size can be used for the entire frame, as long as the upper bound can be accommodated by buffer 104.

Referring now to FIG. 2, one embodiment of bit-rate allocation unit 103 is shown in greater detail. With each new frame processed by encoder 102, a frame sync signal on line 110 is generated and applied to unit 103. Concurrently, a new frame-type $T_i$ arrives via line 112. This signal constitutes the address input to a look-up-table (LUT) 201, which may be implemented in a ROM. By loading appropriate data in the ROM, LUT 201 is arranged to output a control signal indicative of the desired number of bits $R_i$ to be read out from buffer 104. The values for $R_i$ may be calculated as described below in Eqs. (5)–(6). The control signal just mentioned is applied to a voltage controlled oscillator 202 or similar clock device to generate a corresponding series of timing pulses that are applied as the read clock input of buffer 104 on line 203.

The values for the $R_i$'s output from look up table 201 are chosen so that the total assigned bits during each GOF equals as nearly as possible the bits that can be accommodated by the channel during the GOF. That is, if the channel bit-rate is C bits/sec and the frame period is P seconds, then $$\sum_{i=1}^{N} R_i = N*P*C \text{ bits/GOF} \quad (1)$$

Since most of the desirable and efficient video coding techniques do not produce a fixed number of bits per frame, especially with the feedback buffer control strategies commonly used, the task of computing $R_i$ is not trivial. The problem is further complicated by the interaction between coding methods. Frames coded by one technique are often employed to calculate predictions used to code other frames by other techniques. Thus, experimentation will sometimes be used to choose the best set of values for $R_i$, which are then "entered" in table 201 by associating the contents of various storage locations or cells with the addresses of such cells. In this way, the appropriate signal is output from LUT 201 to produce the value of $R_i$ desired for each $T_i$.

If an experimental solution to determining the values for $R_i$ is not desired, a good starting point for a mathematical analysis can often be found as follows. Suppose that the parameters of each of the M image coding techniques or methods are adjusted so that approximately equal image quality is produced by each, for a variety of normal picture material. This implies that some knowledge of expected image quality for the available channel capacity is available beforehand. It may also require the disabling of some of the interactivity between coding methods, eg., using original uncoded frames for calculating predictions.

In any event, under these average hypothetical operating conditions, let B(m) be the average number of bits per frame produced by coding method m (m = 1 ... M). Then under these conditions, the average total number of bits per GOF is given by $$\sum_{i=1}^{N} B(T_i) \text{ bits/GOF} \quad (2)$$

Usually, the values given by Eqs. (1) and (2) will not be equal. However, they can be made equal if each term of Eq. (2) is multiplied by the normalization factor $$\frac{N*P*C}{\sum_{i=1}^{N} B(T_i)} \quad (3)$$

The assigned bits $P*R_i$ from Eq. (1) can then be made to match the hypothetical averages of Eq. (2) by setting $$R_i = \frac{N*P*C}{\sum_{i=1}^{N} B(T_i)} B(T_i) \quad (4)$$

Note that each assigned rate $R_i$ depends only on $T_i$. Thus, if we let R(m) be the bitrate rate assigned to coding method m, then $$R(m) = \frac{N*P*C}{\sum_{i=1}^{N} B(T_i)} B(m) \quad (5)$$

and $$R_i = R(T_i) \quad (6)$$

An example will be illustrative:

Assume a channel bit rate C = 1.15 Mbits/sec, a frame period P = 1/30 seconds, and a group of N = 15 frames. Then, N*P*C = 575 Kbits. In accordance with the present invention, the sum of the allocations $\Sigma R_i$ for each GOF is then 575 Kbits, i.e., $R_1+R_2+ \ldots R_{15}=575$ Kbits. Further assume that there are M = 3 types of encoding being used, namely (1) intraframe coding, (2) motion compensated prediction error (MCPE) coding, and (3) conditional motion compensated interpolation (CMCI) coding, and that the allocations for each type are:
B(1) = 170 Kbits/frame
B(2) = 85 Kbits/frame
B(3) = 10 Kbits/frame
Frames in each GOF are arranged to be encoded in a predetermined order such that:

| Frame Number | Frame Type |
|---|---|
| 1 | 1(intraframe) |
| 4,7,10,13 | 2(MCPE) |
| 2,3,5,6,8,9,11,12,14,15 | 3(CMCI) |

Then, $\sum_{i=1}^{15} B(T_i) = 170 + 4(85) + 10(10) = 610$ Kbits.

In accordance with equation (3), $$\frac{N*P*C}{\Sigma B(T_i)} = \frac{575}{610} = 0.943.$$

Thus, in accordance with equation (5), the nominal desired values for $R_i$ are as follows:
R(1) = 0.943 * B(1) = 160.31 Kbits/sec
R(2) = 0.943 * B(2) = 80.155 Kbits/sec
R(3) = 0.943 * B(3) = 9.43 Kbits.sec
The values for $R_i$ are determined by the frame type signal $T_i$ for the $i^{th}$ frame in each GOF, such that $R_i = R(T_i)$, where $T_i$ is 1, 2 or 3 and i = 1, 2 ... 15. Thus, the nominal rate for each frame in the group is as follows:

| Frame Number | Allocation |
|---|---|
| 1 | 160.31 Kbits/sec |
| 4,7,10,13 | 80.155 Kbits/sec |
| 2,3,5,6,8,9,11,12,14,15 | 9.43 Kbits/sec |

In some applications, the communications channel that receives the encoder output and transmits it to a distant location cannot accommodate variable bit-rates. In such cases, an additional buffer 305 may be necessary, as shown in an additional embodiment of the present invention, illustrated in block diagram form in FIG. 3. In this figure, elements that are the same as those shown in FIG. 1 retain the same numerical designations.

In this embodiment, it is desired to apply data to channel 315 at a constant rate. To accomplish this, a second buffer 305 receives the variable rate data stream output from buffer 104 on line 108, under the control of a write clock signal (the same as the read clock applied to buffer 104) that is present on line 203.

Buffer 305 is arranged to generate a buffer fullness signal on line 307, similar to the fullness signal generated by buffer 104 on line 106. This signal is applied to bit rate allocation unit 303 via line 307, and used, in a manner to be described below, to track slow variations in the channel rate that might otherwise lead to buffer 305 filling or emptying. Specifically, if buffer 305 becomes nearly full, allocation unit 303 reduces all of its output clock rates slightly. Conversely, the rates are increased slightly if buffer 305 ever becomes nearly empty. Output is obtained from buffer 305 on line 315, under the control of a fixed rate read clock, applied via line 310 from a constant channel clock source 320, such as a fixed crystal oscillator.

Figure 4:
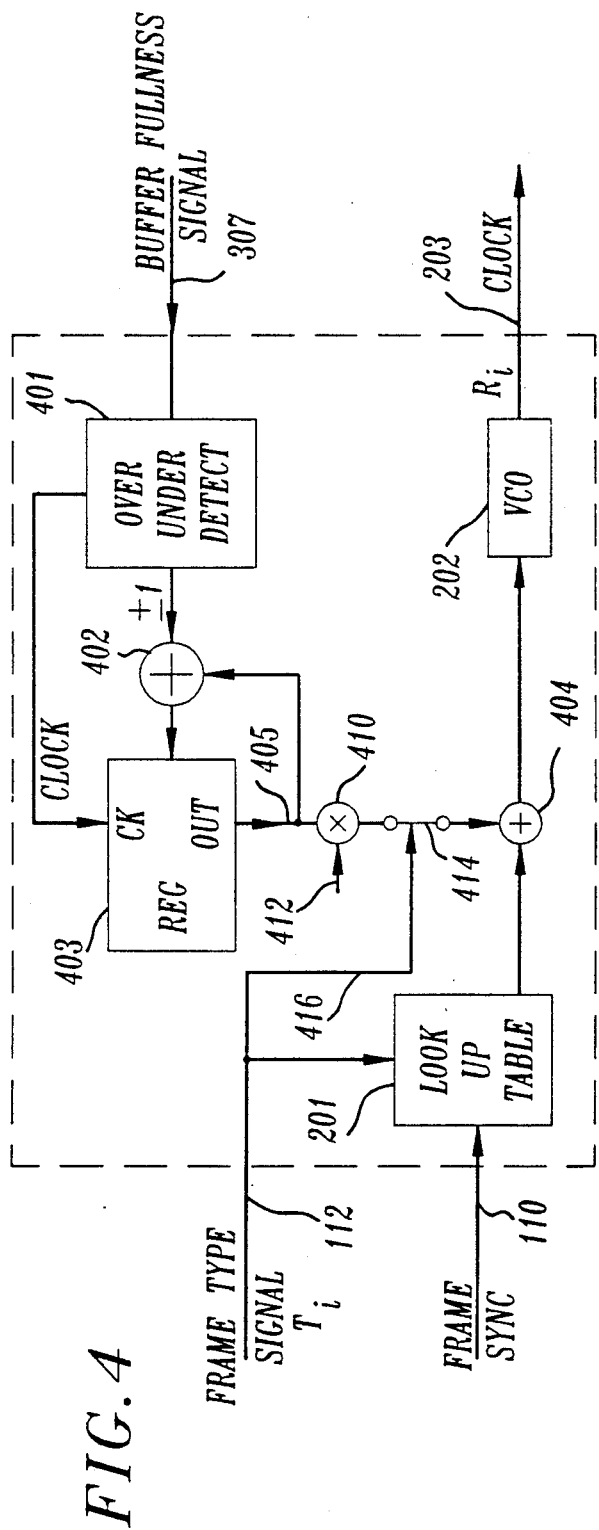
FIG. 4 is a block diagram of the bit rate allocation unit contained in the encoder of FIG. 3.

The buffer fullness signal output from the second buffer 305 is used to advantage in the modified bit allocation unit 303, shown in greater detail in FIG. 4. In that figure, the signal received on line 307 is applied to an overflow/underflow detector 401, which outputs −1 if buffer 305 is too full and +1 if buffer 305 is too empty. Concurrently, when either an under flow or an overflow occurs, a clock pulse is sent from detector 401 to a register 403, to signal the event. Register 403 and adder 402 together constitute an accumulator, also known as an up/down counter. Upon the receipt of a clock pulse by register 403, the current output of detector 401 (+1 or −1) is transferred to the register output on line 405, and held until another clock pulse arrives. At that time, the output of register 403 is again combined with the output of detector 401 in adder 402, and the result is accumulated in register 403. Thus, the output of register 403, which can be positive on negative, will increase or decrease according to the buffer fullness signal, decreasing if the buffer is too full and increasing if the buffer is too empty.

The buffer fullness represented by the signal on line 405 is used to alter by an amount $\Delta R$, the nominal read clock signal $R_i$ otherwise generated by bit allocation unit 303. This is accomplished by virtue of multiplier 410, which scales the value stored in register 403 by an appropriate scaling factor applied on line 412 to produce a correction signal, and by adder circuit 404, which adds or subtracts the correction signal to the signal output from look up table 201. The output from adder 404 is then used as a control input to voltage-controlled oscillator 202, which, as in the embodiment of FIG. 1, then generates the clock output on line 203 having the desired frequency $R_i + \Delta R$ Hz. The scaling factor is selected such that the nominal rate can be changed by a desired deviation. Stated differently, the output from LUT 201 produces output $R_i$ from VCO 202, while the output from register 403 changes the rate by an amount $\Delta R$ determined as a function of fullness of buffer 305.

In some circumstances, it has been found desirable to inhibit changes to the nominal rate assigned to certain types of frames. This is particularly true, for example, in the case when intraframe coding is used. In these instances, a switch 414 interposed between the output of multiplier 410 and the input of adder 404 may be opened, under the control of the frame type signal on line 416, so that only the output from LUT 201 contributes to the computation of $R_i$.

Figure 5:
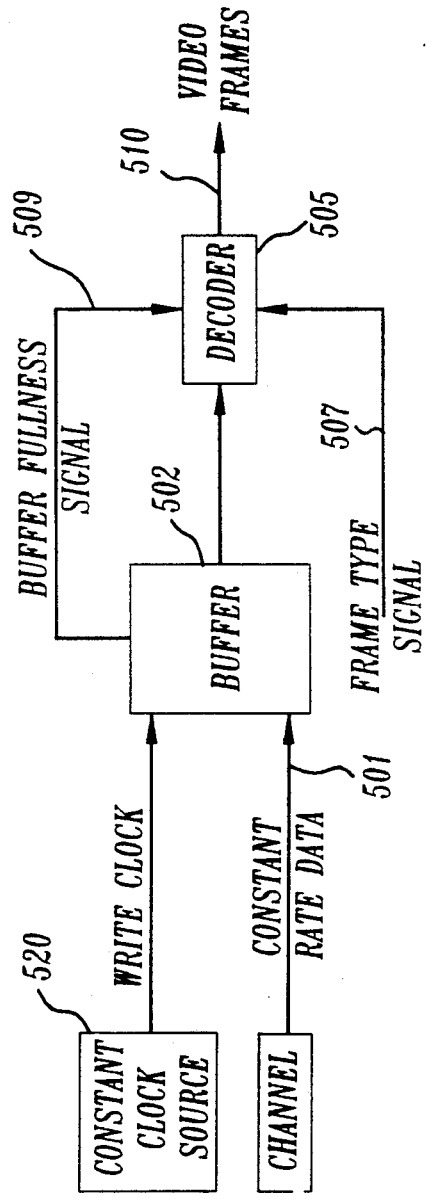
FIG. 5 is a block diagram of a decoder useful in conjunction with the encoders of FIGS. 1 and 3.

FIG. 5 shows a decoder that may be used in conjunction with the encoders of FIGS. 1 and 3. Assuming that the arrangement of FIG. 3 was used, a constant rate clock signal, having the same frequency as that applied on line 310 in FIG. 3, is generated in clock source 520, and used to write incoming data on line 501 into a buffer 502. The output of buffer 502 is applied to a decoder 505, which is capable of decoding data coded using the different coding techniques available in encoder 102. If encoder 102 was in the preprogrammed mode, then decoder 505 will also be preprogrammed to perform the appropriate decoding operations, in the same sequence as that used in the encoder. Alternatively, if encoder 102 is not preprogrammed, then the frame type signal used to control encoder 102 must also be provided to decoder 505, via an input on line 507. In some applications, this signal can be multiplexed with the pictorial data, or it can otherwise be provided via a separate channel.

If the encoder arrangement of FIG. 1 was used, buffer 502 will receive input data at a variable rate. In such event, a clock recovery circuit will be included to provide the write clock signal depicted in FIG. 5, rather than clock source 520.

Buffer 502, like buffers 104 and 305, advantageously will be arranged to produce a buffer fullness signal that, in the arrangement of FIG. 5 is used to control one aspect of the operation of decoder 505. Specifically, if buffer 502 is filling up, decoder 505 may be arranged to speed up its operation. Conversely, if the buffer becomes too empty, decoder 505 is instructed to slow down.

Numerous extensions are possible for the present invention. For example, the GOF structure could change during coding in response to a different types of video inputs. This might occur if a switch were to occur from still images to scenes containing a good deal of motion. If during the coding, one or more frames were deleted from transmission due to excessive bits being generated, then a special value of $R_i$ might be invoked.

What is claimed is:
1. Apparatus for encoding frames in a continuous motion video signal for application to a channel having the capacity to carry information at a predetermined average bit rate, comprising:
   means for generating a frame type signal classifying each of said frames in accordance with an expected number of bits required to represent the information contained in each of said frames when said frames are encoded using particular coding strategies, said frame type signal being independent of the pictorial content of said frames;
   means jointly responsive to said video signal and said frame type signal for generating an encoded signal representing said information in each of said frames;
   buffering means arranged to receive said encoded signal output from said encoding means at a first bit rate and for reading out said encoded signal at a second bit rate; and
   means for reading out from said buffering means at a controlled rate the portion of said encoded signal representing each frame in such a way that said channel average bit rate is not exceeded, said controlled rate being a function of the expected number of bits required to represent the information in said frame relative to the expected number of bits required to represent information in other ones of said frames.

2. The invention defined in claim 1 wherein said last mentioned means includes a look-up table for associating values of said frame type signal with nominal rates for reading out information from said buffering means.

3. Apparatus for encoding pictorial information contained in a series of frames of a continuous motion video signal prior to application to a channel having the capacity to carry information at a predetermined average bit rate, comprising:
   means for classifying each of said frames independent of the pictorial content of said frames;
   means responsive to said classifying means for determining the bit rate required to encode information contained in said frames;
   variable rate coding means for generating an encoded signal containing bits representing said information in each of said frames, said encoded signal having a first bit rate; and
   first buffering means responsive to said encoded signal output from said encoding means for reading out bits in said encoded signal at a second bit rate that is a function of an output from said classifying means indicative of the bit rate required to encode information in the presently processed frame relative to the bit rate required to encode information in other frames.

4. The invention defined in claim 3 wherein said apparatus further includes second buffering means arranged to receive bits output from said first buffering means and to read out said bits at a constant rate.

5. Apparatus for encoding pictorial information contained in a series of frames, comprising:
  means for generating a frame type signal, said frame type signal classifying a priori each of said frames in accordance with the bit rate required to encode information contained in said frames;
  variable rate coding means for generating an encoded signal representing said information in each of said frames, said encoded signal having a highly variable bit rate; and
  buffering means for reducing the variability of said encoded signal in response to the relationship between the expected number of bits required to represent the information in each of said frames relative to the expected number of bits required to represent information in other ones of said frames.

6. The invention defined in claim 5 wherein said buffering means includes a first buffer arranged to read out bits in each of said frames at a rate determined in accordance with said frame type signal.

7. A method of encoding frames in a continuous motion video signal for application to a channel having the capacity to carry information at a predetermined average bit rate, comprising the steps of
  generating a frame type signal classifying each of said frames in accordance with an expected number of bits required to represent the information contained in each of said frames when said frames are encoded using particular coding strategies, said frame type signal being independent of the pictorial content of said frames;
  generating an encoded signal representing said information in each of said frames jointly in response to said video signal and said frame type signal;
  applying said encoded signal output from said encoding means to a buffer; and
  reading out from said buffering means at a controlled rate the portion of said encoded signal representing each frame in such a way that said channel average bit rate is not exceeded, said controlled rate being a function of the expected number of bits required to represent the information in said frame relative to the expected number of bits required to represent information in other ones of said frames.

8. The method defined in claim 7 wherein said last mentioned step includes the step of associating in a look-up table, values of said frame type signal with nominal rates for reading out information from said buffer.

9. A method of encoding pictorial information contained in a series of frames of a continuous motion video signal prior to application to a channel having the capacity to carry information at a predetermined average bit rate, comprising the steps of
  classifying each of said frames independent of the pictorial content of said frames;
  determining, in response to said classification, the bit rate required to encode information contained in said frames;
  generating an encoded signal containing bits representing said information in each of said frames;
  inputting said encoded signal in a buffer at a first bit rate; and
  outputting said encoded signal from said buffer at a second rate determined as a function of said classifying step and indicative of the bit rate required to encode information in the presently processed frame relative to the bit rate required to encode information in other frames..

10. A method of encoding pictorial information contained in a series of frames, comprising the steps of
  generating a frame type signal, said frame type signal classifying a priori each of said frames in accordance with the bit rate required to encode information contained in said frames;
  generating an encoded signal representing said information in each of said frames, said encoded signal having a highly variable bit rate; and
  buffering said encoded signal to alter said bit rate in response to the relationship between the expected number of bits required to represent the information in each of said frames and the expected number of bits required to represent information in other ones of said frames.

11. The method defined in claim 10 wherein said buffering step includes reading out bits in each of said frames at a rate determined in accordance with said frame type signal.

* * * * *